United States Patent [19]

Judge

[11] Patent Number: 4,581,639
[45] Date of Patent: Apr. 8, 1986

[54] METHOD AND APPARATUS FOR MONITORING SUITABILITY OF A TRANSMISSION PATH FOR TRANSMISSION OF DIGITAL DATA SIGNALS

[75] Inventor: John L. Judge, Hillsboro, Oreg.

[73] Assignee: Tektronix, Inc., Beaverton, Oreg.

[21] Appl. No.: 542,874

[22] Filed: Oct. 17, 1983

[51] Int. Cl.[4] .................... H04N 17/00; H04B 17/00
[52] U.S. Cl. ..................................... 358/139; 375/10;
 328/187; 178/69 A
[58] Field of Search ........................ 358/139, 10, 150;
 324/77 R, 75; 328/187, 188; 455/67; 375/10,
 13; 371/22; 370/13; 178/69 R, 69 A

[56] References Cited

U.S. PATENT DOCUMENTS

| | | | |
|---|---|---|---|
| 2,738,417 | 3/1956 | Hunt | 375/13 |
| 3,390,336 | 6/1968 | Di Toro | 375/13 |
| 4,377,822 | 3/1983 | Noirel | 358/139 |
| 4,479,146 | 10/1984 | Cohn | 358/139 |

Primary Examiner—Howard W. Britton
Attorney, Agent, or Firm—John Smith-Hill

[57] ABSTRACT

The suitability of a transmission path (16 or 18) for transmission of digital data is monitored by transmitting a test signal over the transmission path. The test signal is composed of a succession of video signal lines each including a horizontal sync pulse and a pattern of digital 1's and 0's at a predetermined frequency and occurring on each line at the same data positions relative to the horizontal sync pulse. The patterns comprise a reference pattern of alternating 1's and 0's and test pattern of 1's and 0's at random or in a sequence known to be disruptive to the transmission path. The test signal is received and is displayed on a waveform monitor (28) with the reference pattern and the test pattern interleaved with the complement of the reference pattern and complement of the test pattern, so that the four patterns are superimposed and enclose a generally eye-shaped area.

7 Claims, 5 Drawing Figures

METHOD AND APPARATUS FOR MONITORING SUITABILITY OF A TRANSMISSION PATH FOR TRANSMISSION OF DIGITAL DATA SIGNALS

This invention relates to a method and apparatus for monitoring suitability of a transmission path for transmission of digital data signals.

BACKGROUND OF THE INVENTION

Binary digital data is generally communicated from a transmission location to a receiving location by impressing a signal representing the data on a transmission path (which term is used herein to designate both a broadcast medium, such as air, and a transmission line, such as a metallic cable, a waveguide or an optical fiber guide) from the transmission location to the receiving location. Depending on the nature of the transmission path, the data signal may be transmitted in modulated or unmodulated, i.e., baseband, form. A periodic clock signal is used to establish a succession of unit intervals of nominally equal duration, within which the successive bits are transmitted. The clock signal is also used to recover the binary data at the receiving location. Thus, using the clock signal, the baseband data signal is sampled of the mid-point of each unit interval in order to determine whether the signal transmitted during that unit interval represented a binary 1 or a binary 0.

Naturally, it is important that digital data be transmitted over the transmission path without unacceptable distortion being introduced by a transmission path, so that the binary data can be accurately recovered at the receiving location. The most serious distortions introduced by a transmission path include high-frequency rolloff, i.e., the manner in which the attenuation factor of a transmission path increases as a function of the frequency of the signal being transmitted and the group delay distortion which is associated with high-frequency rolloff. For this reason, the data signal is configured to minimize its high-frequency components by avoiding use of rectangular transitions between binary 1's and binary 0's and causing the data signal to follow a predetermined non-rectangular trajectory, e.g., of sinusoidal or sine-squared form, which includes fewer high-frequency components than a rectangular signal trajectory.

It is well known to use an eye diagram to monitor the suitability of a transmission path between a transmission location and a remote receiving location for transmission of digital data. The eye diagram is generated by displaying the received data signal on an oscilloscope synchronized to the clock signal. The display is a representation of the eight possible signal trajectories through a unit interval and defines an area shaped somewhat as the human eye. The severity of the high frequency rolloff of the transmission path manifests itself in the eye diagram as a distortion from its ideal form. Thus, instead of the CRT display showin an eye in which the peak and trough of the eye are precisely half way between the intersections of the waveforms, the peak and trough between two successive intersections are closer, along the time axis, to the earlier intersection than to the later intersection. The use of eye diagrams is discussed at length in chapter 27 of "Transmission Systems for Communications", Bell Telephone Laboratories, 1971, and Ingram, "Analysis And Design of Digital Transmission Systems", Computers and Digital Techniques, 1979, Vol. 2, No. 3.

A known technique for transmitting data that is attracting an increasing amount of attention is the so-called teletext system, in which data is transmitted during the vertical interval of the conventional video signal and is decoded by the television receiver to provide an alphanumeric display. In the transmission of teletext, each line of the vertical interval that is used for data includes not only the data itself (a succession of binary 1's and 0's) but also a clock lead-in sequence of alternating 1's and 0's which precedes the data interval and is used in the receiver to regenerate a clock signal, without which the data cannot be recovered.

It is at present known to monitor the suitability of a transmission path for transmission of teletext by employing a clock regenerator and an oscilloscope. The clock regenerator regenerates the clock signal from the clock lead-in sequence, and the clock signal is applied to the horizontal sweep input of the oscilloscope. The data signal is applied to the vertical deflection input. Clearly, this technique requires the availability of both a clock regenerator and an oscilloscope.

SUMMARY OF THE INVENTION

According to a first aspect of the present invention there is provided a method of monitoring suitability of a transmission path for transmission of digital data referenced to a clock signal comprising an alternating sequence of digital 1's and digital 0's at a predetermined frequency, said method comprising transmitting a test signal over the transmission path, the test signal being composed of a succession of video signal lines each including a horizontal sync pulse and a pattern of digital 1's and 0's at said predetermined frequency and occurring on each line at the same data positions relative to the horizontal syn pulse, the patterns comprising a reference pattern of alternating 1's and 0's, a test pattern of 1's and 0's at random or in a sequence known to be disruptive to the transmission path, the complement of the reference pattern, and the complement of the test pattern, and the method also comprising receiving the transmitted test signal, and displaying the received test signal on a waveform monitor with the several patterns interleaved.

According to a second aspect of the present invention there is provided an apparatus for use in monitoring suitability of a transmission path for transmission of digital data, said apparatus comprising a signal generator for generating a test signal composed of a succession of video signal lines each including a horizontal sync pulse and a pattern of digital 1's and 0's at a predetermined frequency and occurring on each line at the same data positions relative to the horizontal sync pulse, the patterns comprising a reference pattern of alternating 1's and 0's a test pattern of 1's and 0's at random or in a sequence known to be disruptive to the transmission path, the complement of the reference pattern, and the complement of the test pattern, so that when the test signal is transmitted over a transmission path under test and the received signal is displayed on a waveform monitor with the several patterns interleaved, the four patterns are superimposed and enclose a generally eye-shaped area, the configuration of which area depends on the suitability of the transmission path for transmission of digital data.

As used herein, the term "waveform monitor" means a display device in which a dot appears against a visually contrasting background and sweeps in one direction across the background at a predetermined speed, each sweep being triggered by the horizontal sync pulse of a video signal, and is deflected in a direction perpendicular to the sweep direction in dependence upon the voltage level of the video signal A known form of waveform monitor uses a CRT display.

BRIEF DESCRIPTION OF THE DRAWINGS

For a better understanding of the invention, and to show how the same may be carried into effect, reference will now be made, by way of example, to the accompanying drawing in which.

DETAILED DESCRIPTION

Figure 1:
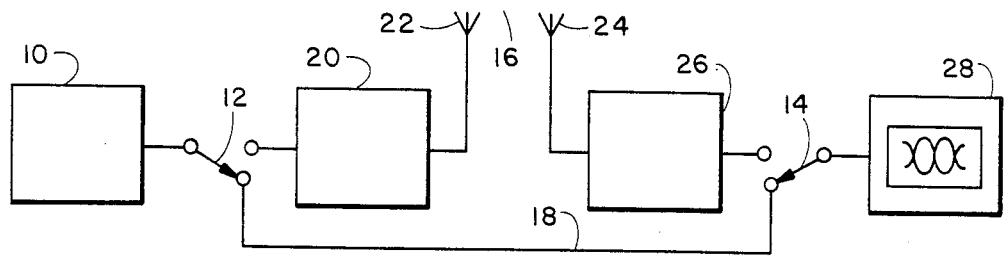
FIG. 1 is a simplified block diagram of apparatus for monitoring suitability of a transmission path for transmission of digital data.

The apparatus shown in FIG. 1 comprises a signal generator 10 which generates a test signal. The test signal is applied to a switch 12 which is used in conjunction with a second switch 14 to select whether a broadcast medium 16 or a transmission line 18 is to be tested. If the broadcast medium is tested, the switch 12 applies the test signal to a transmitter and modulator 20 which drives a transmission antenna 22. A receiving antenna 24 receives the broadcast signal and applies it to a receiver and demodulator 26 which extracts the test signal from the broadcast signal and applies it to a waveform monitor 28 through the switch 14. In the event that the transmission line 18 is selected for testing, the test signal from the generator is applied to the transmission line by the switch 12, and the switch 14 applies the transmitted test signal to the waveform monitor.

Figure 3:
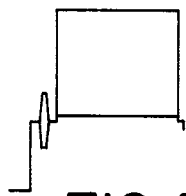
FIG. 3 illustrates the display obtained on a waveform monitor when the test signal is transmitted over a nominally distortionless transmission path.
Figure 4:
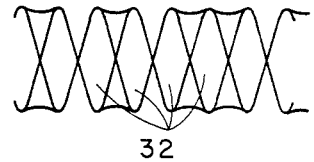
FIG. 4 illustrates a horizontally expanded version of the FIG. 3 display.

The test signal generator is used to generate a four-field video test signal. The waveforms of the four fields are shown in FIGS. 2a, b, c and d respectively. A reference data pattern of alternating 1's and 0's, as shown in FIG. 2a, is placed on field one. A pattern which is exactly the complement of the reference data pattern is placed on field three of the video signal, as shown in FIG. 2b. A test data pattern, which may be a random sequence of 1's and 0's or a fixed sequence which is known to be disruptive to the transmission path under test, is placed on field two of the video signal, as shown in FIG. 2c, and the complement of the test data pattern is placed on field four (FIG. 2d). If the waveform monitor is set to display all four fields of a given line, the display will be as shown in FIG. 3. The individual waveforms cannot be discerned at this horizontal scale. However, if the display is expanded horizontally the four waveforms of the given line, on the four fields respectively, can be distinguished and they will interleave, as shown in FIG. 4. It can be seem from FIG. 4 that the four waveforms enclose generally eye-shaped areas 32 at the bit positions of the waveforms.

Figure 2:
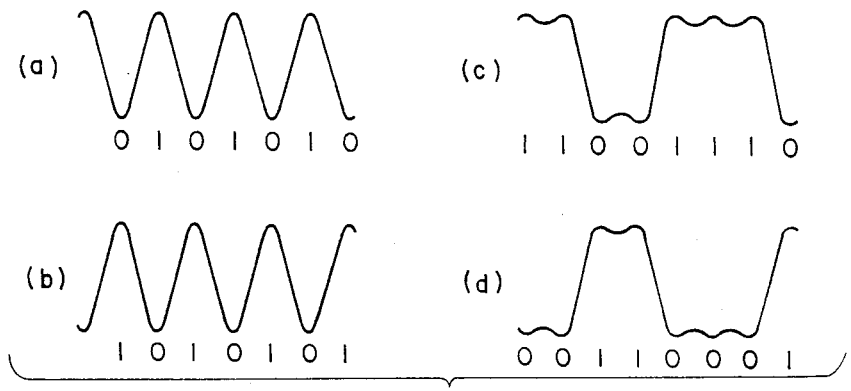
FIG. 2 illustrates the waveforms of a four-field video test signal.
Figure 5:
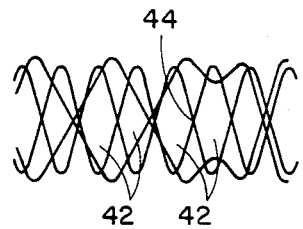
FIG. 5 illustrates a corresponding view obtained when the signal is transmitted over a transmission path exhibiting high frequency rolloff.

FIG. 2 represents the waveforms of a signal which has been transmitted over an essentially distortionless transmission path, and therefore the waveforms of FIGS. 2a and 2b essentially overlay much of the waveforms of FIGS. 2d and 2c respectively when displayed. However, if the signal is transmitted from the test signal generator to the waveform monitor through a typical "real" transmission path which introduces echo errors and frequency related distortions such as group delay, the waveforms are not superposed when displayed because the departures of the transmission path from ideal characteristics affect the different signal trajectories in different manners. Thus, a transmission path error affects all parts of the reference signal (and its complement) in the same manner while the test signal and its complement are affected in a manner which depends upon the data sequence. FIG. 5 is a view corresponding to FIG. 4 wherein the transmission path includes an uncompensated 4.2 MHz lowpass filter. It will be seem that the eye shapes 42 enclosed by the waveforms in FIG. 5 are considerably different from the shapes 32 enclosed by the waveforms in FIG. 4. The clear height of the eye shape is a measure of the amplitude of the signal that is passed by the transmission line. The intersections 44 of the reference signal and its complement provide reference positions for ideal zero crossing, and differences in the horizontal distance between the intersections and the point at which the eye shape has maximum clear height is a measure of group delay introduced by the transmission path. By selection of a data sequence which is known to be disruptive to the transmission path, it is possible to obtain an accurate indication of the amount of distortion introduced by the transmission path and thus of the error rate likely to be suffered in transmission of digital data over the transmission path.

It will be appreciated that the invention is not limited to the particular method and apparatus which have been described, since variations may be made therein without departing from the scope of the invention as defined in the appended claims and equivalents thereof. In particular, although the waveforms shown in FIG. 2 will be seen to be substantially sinusoidal in form, it is not essential to the invention that the waveforms be sinusoidal.

I claim:

1. A method of monitoring suitability of a transmission path for transmission of digital data referenced to a clock signal comprising an alternating sequence of digital 1's and digital 0's at a predetermined frequency, said method comprising transmitting a test signal over the transmission path, the test signal being composed of a succession of patterns of digital 1's and 0's at said predetermined frequency and occurring on each line at the same data positions relative to a succession of synchronizing pulses, the patterns comprising a reference pattern of alternating 1's and 0's and a test pattern of 1's and 0's at random or in a sequence known to be disruptive to the transmission path, and the method also comprising receiving the test signal and displaying the received test signal on a display device having its sweep triggered by the synchronizing pulses and with the reference pattern and the test pattern interleaved with the complement of the reference pattern and the complement of the test pattern.

2. A method according to claim 1, wherein said display device is a waveform monitor and said patterns of digital 1's and 0's occur in a succession of video signal lines, the synchronizing pulses being the horizontal sync pulses of the video signal.

3. A method according to claim 2, wherein the test signal is a four-field video signal that has the reference pattern on a predetermined line of a first field, the test pattern on said predetermined line of a second field, the complement of the reference pattern on said predetermined line of a third field and the complement of the test pattern on said predetermined line of the fourth field, and the waveform monitor is set to display all four fields of said predetermined line.

4. An apparatus for use in monitoring suitability of a transmission path for transmission of digital data, said apparatus comprising a signal generator for generating a test signal composed of a succession of patterns of digital 1's and 0's at a predetermined frequency and occurring on each line at the same data positions relative to a succession of synchronizing pulses, the patterns comprising a reference pattern of alternating 1's and 0's and a test pattern of 1's and 0's at random or in a sequence known to be disruptive to the transmission path, so that when the test signal is transmitted over a transmission path under test and a received signal is displayed on a display device having its sweep triggered by the synchronizing pulses and the reference pattern and the test pattern are interleaved with the complement of the reference pattern and the complement of the test pattern, the four patterns are superimposed and enclose a generally eye-shaped area, the configuration of which area depends on the suitability of the transmission path for transmission of digital data.

5. Apparatus according to claim 4, wherein the pattern, that form the test signal comprise the reference pattern, the test pattern, the complement of the reference pattern and the complement of the test pattern.

6. An apparatus for use in monitoring suitability of a transmission path for transmission of digital data, said apparatus comprising, in combination:
 (a) a signal generator for generating a test signal composed of a succession of video signal lines each including a horizontal sync pulse and a pattern of digital 1's and 0's at a predetermined frequency and occurring on each line at the same data positions relative to the horizontal sync pulse, the patterns comprising a reference pattern of alternating 1's and 0's and a test pattern of 1's and 0's at random or in a sequence known to be disruptive to the transmission path,
 (b) means for receiving a signal transmitted over the transmission path, and
 (c) a waveform monitor for displaying the received signal with the reference pattern and the test pattern interleved with the complement of the reference pattern and the complement of the test pattern.

7. Apparatus according to claim 6, wherein the patterns that form the test signal comprise the reference pattern, the test pattern, the complement of the reference pattern and the complement of the test pattern.

* * * * *